United States Patent
Andress et al.

[11] Patent Number: 5,915,366
[45] Date of Patent: Jun. 29, 1999

[54] DEVICE FOR REGULATING THE INTAKE AIR TEMPERATURE IN AN INTERNAL COMBUSTION ENGINE

[75] Inventors: Heinz Andress, Erdmannhausen; Peter Ropertz, Moeglingen, both of Germany

[73] Assignee: Filterwerk Mann & Hummel GmbH, Ludwigsburg, Germany

[21] Appl. No.: 08/981,483

[22] PCT Filed: May 7, 1996

[86] PCT No.: PCT/EP96/01893

§ 371 Date: May 5, 1998

§ 102(e) Date: May 5, 1998

[87] PCT Pub. No.: WO97/01703

PCT Pub. Date: Jan. 16, 1997

[30] Foreign Application Priority Data

Jun. 27, 1995 [DE] Germany .................... 195 23 297

[51] Int. Cl.$^6$ ............................................. F02M 31/00
[52] U.S. Cl. .................................... 123/552; 123/556
[58] Field of Search ....................................... 123/552, 556

[56] References Cited

U.S. PATENT DOCUMENTS 3,801,078 4/1974 Denton et al. ...................... 123/552
4,565,176 1/1986 Alf et al. ............................. 123/552

*Primary Examiner*—Noah P. Kamen
*Attorney, Agent, or Firm*—Evenson, McKeown, Edwards & Lenahan, P.L.L.C.

[57] ABSTRACT

A device is disclosed for regulating the intake air temperature in an internal combustion engine. It comprises a cold air duct, a warm air duct and a mixed air duct, the mixed air duct, also called primary air duct, is provided with a control flap, which in one final position closes off the cold air duct and in the other final position closes off the warm air duct and can pivot under the action of a wax-type thermostat around which the cold intake air flows. The wax-type thermostat is provided with a tie rod connecting it to the control flap. A restoring spring is located on the tie rod. In addition, an excess travel spring is provided to compensate for the excess travel of the wax-type thermostat. The control flap has longitudinal guiding means designed to take up the excess travel, the excess travel spring being mounted on longitudinal guiding means.

7 Claims, 4 Drawing Sheets

DEVICE FOR REGULATING THE INTAKE AIR TEMPERATURE IN AN INTERNAL COMBUSTION ENGINE

BACKGROUND OF THE INVENTION

The invention relates to a device for regulating the temperature of the intake air in an internal combustion engine Such devices, as have become known from German Patent 15 26 662, for example, are simple in construction and accordingly inexpensive to produce. The wax thermostat constitutes a regulating means with sufficient power and adequate stroke length for its intended purpose.

A disadvantage of this apparatus, however, is to be seen in the fact that all of the components are disposed in the duct for the cold air or mixed air, resulting in increased resistance to flow. An effort is therefore made to streamline the flow device and avoid the use of large parts.

German Offenlegungsschrift discloses a device which is contained in a shunt duct. Mixed air flows around this device, but here again the mixed air has to overcome considerable flow resistance.

U.S. Pat. No. 4,340,172 furthermore discloses a device for regulating the temperature of the intake air in an internal combustion engine. This one is also situated largely in the mixed air duct and from there it controls two flaps arranged parallel and operating contrariwise.

A disadvantage of this device is to be seen in the fact that the mixed air encounters considerable resistance to flow. Moreover, on the basis of the principle of its design, both a restoring spring is necessary for the wax thermostat as well as an overtravel compensation spring and a restoring spring for the control valve.

The restoring spring for the wax thermostat and the overtravel spring are concentric inside of one another. A disadvantage of this arrangement, however, is that here the diameter of the device is very greatly increased and therefore, again, the flow properties are very greatly affected.

SUMMARY OF THE INVENTION

The invention is addressed to the problem of avoiding the described advantages and creating a device for regulating the temperature of the intake air in an internal combustion engine which can be arranged in the intake duct in a streamlined and reliably operating manner.

This problem is solved by the features recited in the appended claims.

The important advantage of the invention is that, through the arrangement of the overtravel spring on the control flap, a very slender design of the entire device is achieved. Furthermore, the overall length of the device can be shortened, since the overtravel spring is disposed, not ahead of the point where the pull rod is fastened to the control flap, but behind the point where the pull rod is fastened to the control flap.

A further advantage also lies in the fact that no additional closing spring is needed for the control flap for the purpose of preventing the control flap from fluttering.

According to an embodiment of the invention, the longitudinal guide has a hook which is disposed on the control flap. The pull rod engages this hook. This hook is at the same time a point of contact for a 3 which is disposed in the longitudinal guide. In the normal position the sliding element lies thus at the one end in the eye of the hook and at the other end on the longitudinal guide.

In another embodiment of the invention the control flap is provided with a so-called "air damping member." This is a substantially hollow cylindrical projection which extends into the warm-air duct and steers the air stream close to the closed position.

In another embodiment of the invention the pull rod, which at one end is disposed on the wax thermostat and at its opposite end is mounted in a guide affixed to the housing. This guide can simply be a bore through which the pull rod is passed.

The hook for the pull rod and the pusher is open on one side, the opening angle being limited so that any over-stroke will be able to move the pusher along the guide only if the control flap is entirely closed. This has the advantage that the entire device operates without trouble, i.e., any tilting or blockage of the control flap and any positioning error due to premature starting of the overtravel, will be prevented.

In an advantageous embodiment of the invention, both of the air entry openings, i.e., the cold-air inlet opening and the inlet opening for the warm air, are opened or closed by the wax thermostat and the control flap. A second flap, which would result in an increase of the resistance to flow, is thus unnecessary.

These and other features of preferred embodiments of the invention will be found not only in the claims but also in the description and the drawings, while the individual features can be embodied each by itself or with others in the form of subcombinations in the embodiment of the invention and in other fields, and may constitute advantageous as well as independently patentable embodiments for which protection is hereby claimed.

BRIEF DESCRIPTION OF THE DRAWING

The invention is further explained below with the aid of examples of its embodiment.

DETAILED DESCRIPTION OF PREFERRED EMBODIMENTS

Figure 1:
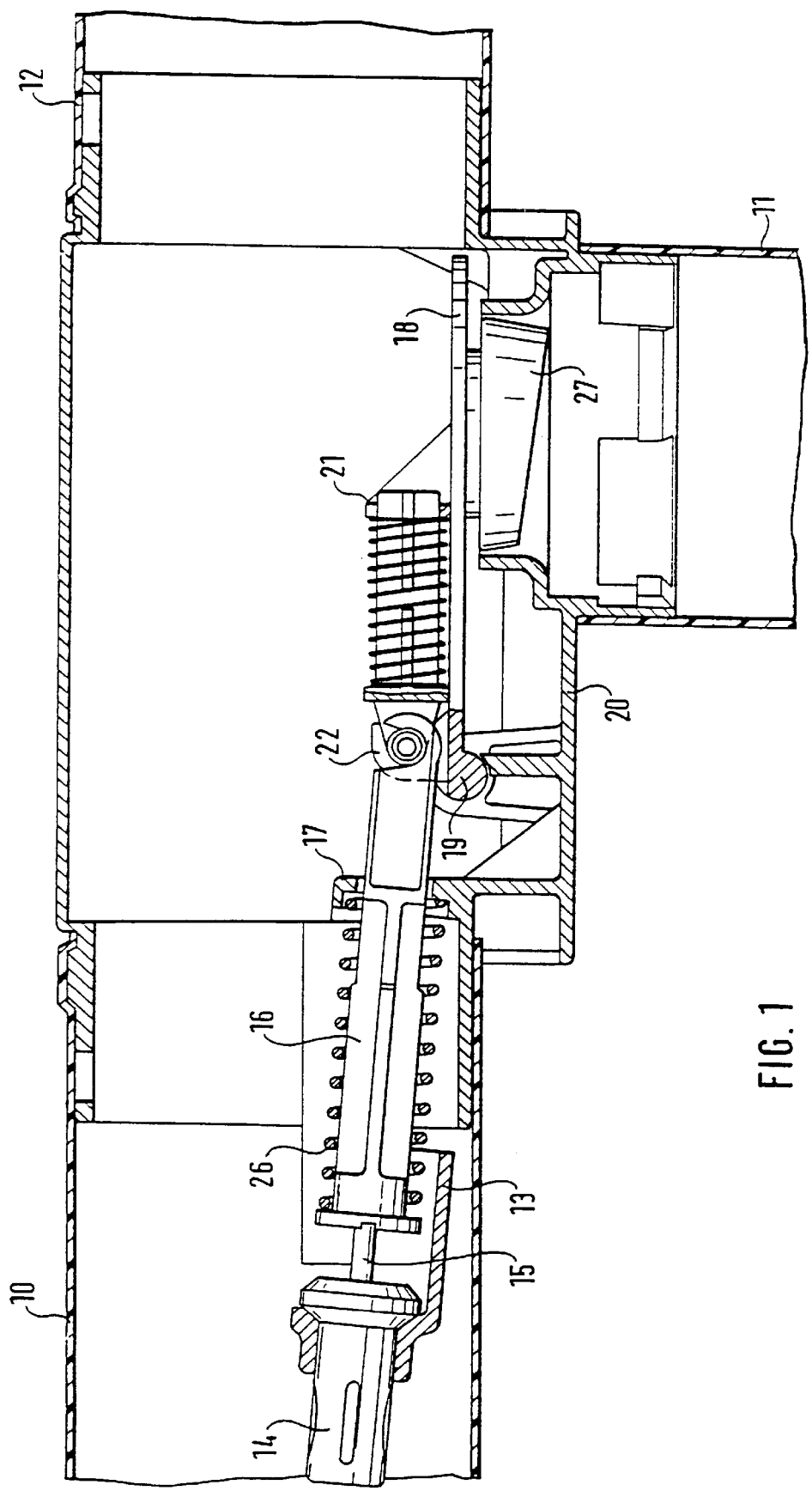
FIG. 1 is the sectional representation of a device for regulating the temperature of the air intake in an internal combustion engine, in the warm air closed position.

FIG. 1 shows a device for regulating the temperature of the air intake, with a cold air duct 10, a warm air duct 11, and a mixed air or raw air duct 12. Each duct is provided with a connection to which an air hose or the like can be attached. In the cold air duct 10 a wax thermostat 14 is disposed on a support 13. The plunger 15 of the wax thermostat 14 is connected to a pull rod 16. At its right end, this pull rod 16 is mounted for axial movement in a guide 17 integral with the housing.

The warm air duct 11 is closed with a control flap 18. The control flap is pivoted about the fulcrum 19 on the housing of the device. On the control flap there is a guide 21 as well as a hook 22.

Figure 2:
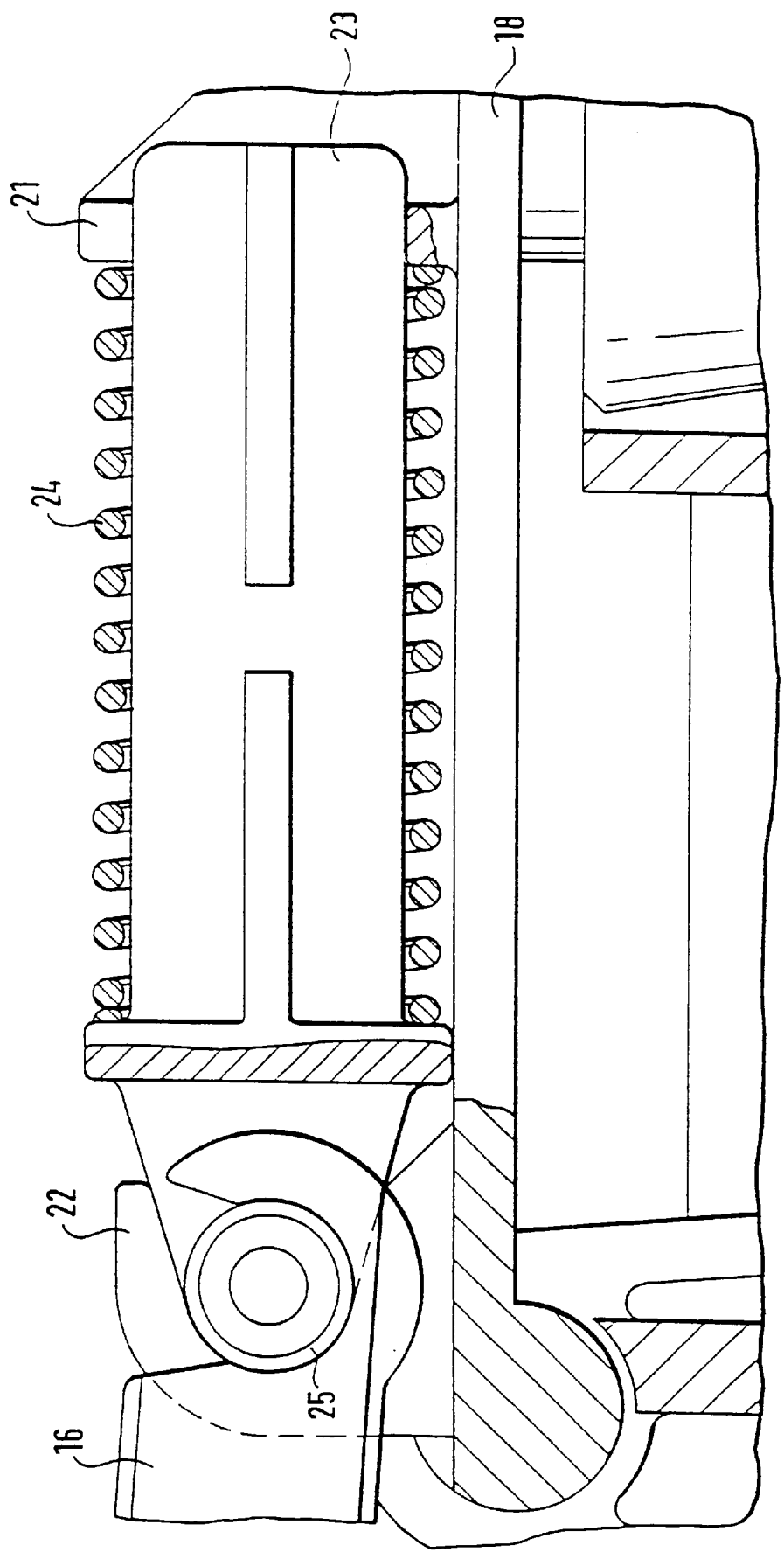
FIG. 2 A detail of the pull rod hook.

FIG. 2 shows a detail of this control flap 18 with the hook 22 and the guide 21. Between hook and guide a sliding element 23 is provided. This sliding element can perform a longitudinal movement, i.e., along the control flap 18, and is biased with a leftward force by a compression spring 24, so that the eye 25 at the left end of the sliding element rests in the hook 22. At the eye 25 the pull rod 16 is snapped in place.

FIG. 1 shows the normal position or null position, i.e., the warm air flap is closed, the cold air can flow unhampered into the mixed air duct, and the thermostat 14 shows no overtravel.

Figure 4:
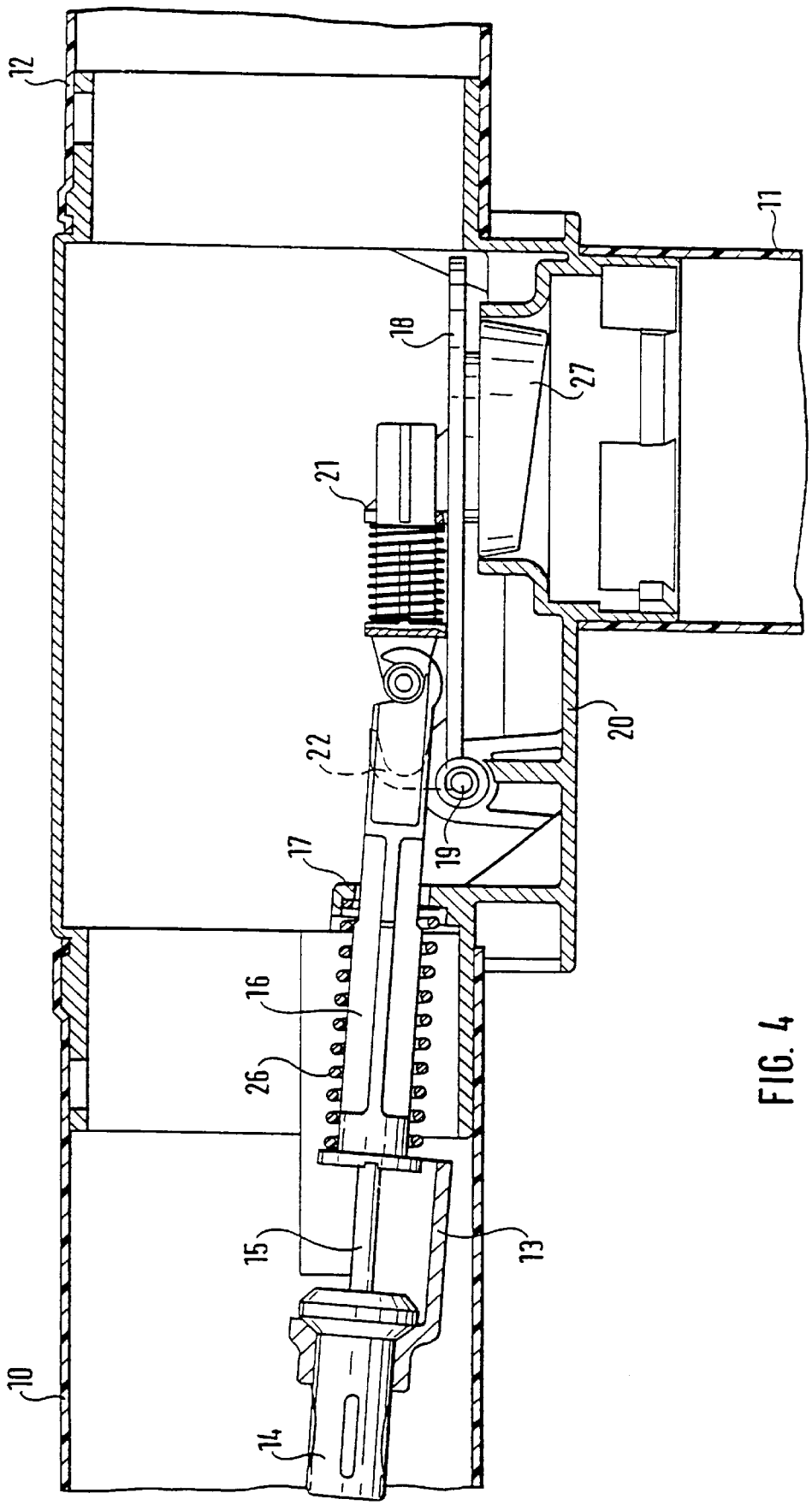
FIG. 4 The device shown in FIG. 1, in the warm air closed position with overtravel.

In FIG. 4, corresponding parts are provided with the same reference numbers. Here the control flap is in the open state, i.e., in this position the warm air can flow unhampered from the warm air duct 11 into the mixed air duct 12. The cold air duct 10 is closed. This position is achieved when the cold air is below a certain minimum value. This cold air causes a retraction of the plunger 15 of the wax thermostat, so that the compression spring on the pull rod 16 moves this pull rod leftward and thus starts the opening movement of the control flap. The control flap swings upward by an angle of about 45°.

In FIG. 4. in which again, corresponding parts are provided with the same reference numbers, the control flap is situated again, as in FIG. 1, in the closed position, i.e., the temperature of the cold air is sufficiently high so that no warm air needs to be delivered. Here, however, the temperature of the cold air results in an overtravel, i.e., the wax thermostat has reached its maximum extension. Thus, the sliding element 23 snaps out of the hook 22 and is moved to the right against the spring force of the spring 24. Due to the guidance of the pull rod 16 as well as the guidance of the sliding element 23 in the guide 21, there results a definite longitudinal movement of the sliding element 23. Since the opening angle of the hook 22 is limited, the eye 25 of the sliding element 23 can jump out of the hook only in this position.

Figure 3:
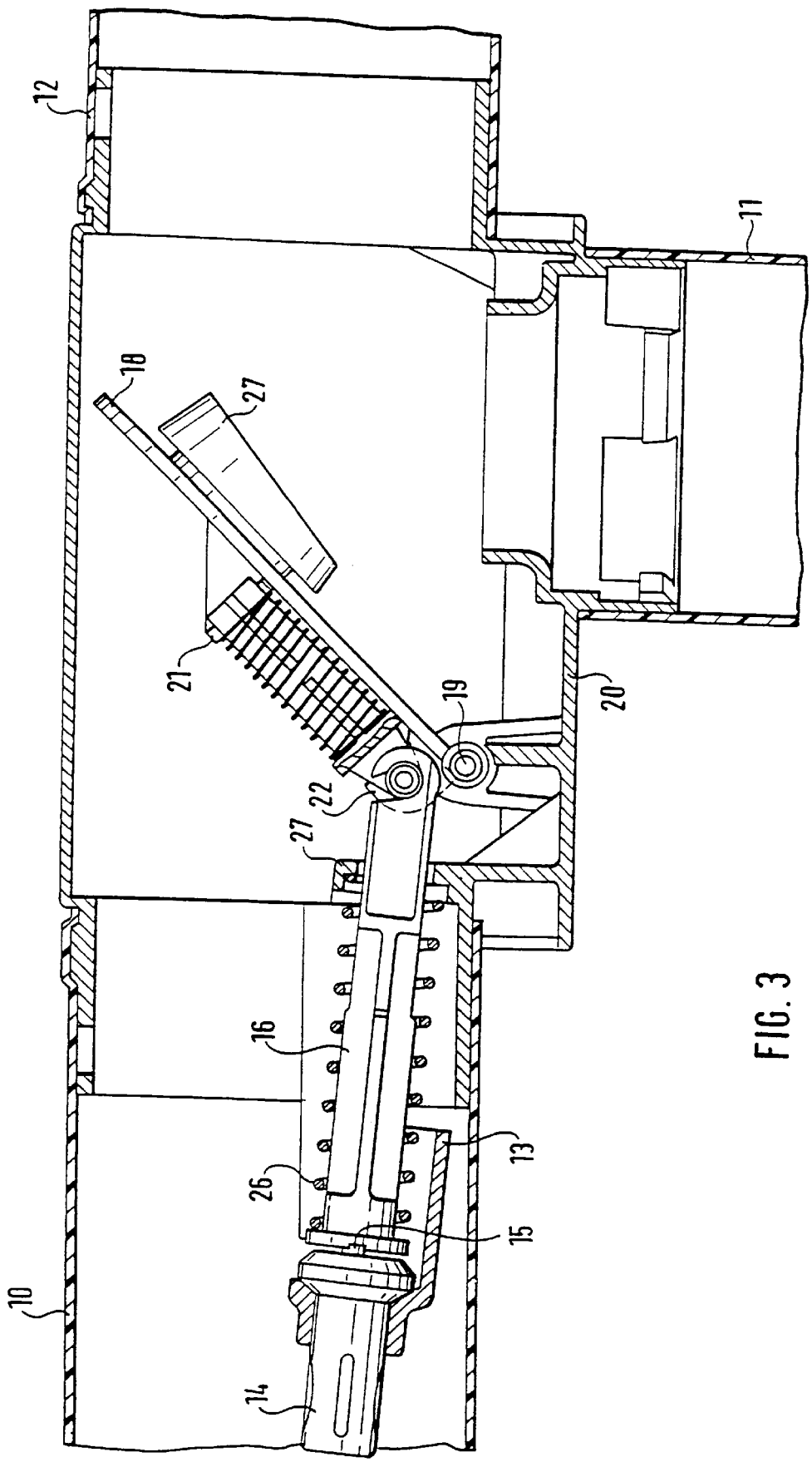
FIG. 3 The device shown in FIG. 1, in the warm air open position.

In the position shown in FIG. 3, the sliding element is unable to jump out of the hook, so that no trouble can be produced by an unintended uncoupling.

We claim:

1. Apparatus for regulating the temperature of intake air in an internal combustion engine, said apparatus comprising an air intake duct comprising a cold air inlet portion, a warm air inlet portion and a mixed air portion; a control flap disposed in the air intake duct for movement between first and second end positions, said control flap in the first end position closing the cold air inlet portion, and said control flap in the second end position closing the warm air inlet portion; a wax thermostat arranged in said air intake duct so that intake air drawn in through the duct passes around said wax thermostat, said wax thermostat being operatively connected by a pull rod to said control flap for moving the control flap; a restoring spring situated on said pull rod, a longitudinal guide provided on the control flap for accommodating excess travel by the wax thermostat, and an excess travel spring disposed on the longitudinal guide for compensating for excess travel of the wax thermostat.

2. An apparatus according to claim 1, wherein said longitudinal guide comprises a hook disposed on the control flap, said hook engaging said pull rod, and said apparatus further comprises a sliding element disposed in said longitudinal guide.

3. An apparatus according to claim 2, wherein said sliding element is engaged by said hook, and said sliding element being released from said hook when said control flap is fully closed.

4. An apparatus according to claim 1, further comprising an air damping member for said control flap, said air damping member preventing oscillation of said control flap as said control flap approaches a closed position.

5. An apparatus according to claim 1, wherein said pull rod has a first end affixed to said wax thermostat and a second end received in a guide mounted on a housing member.

6. An apparatus according to claim 1, wherein both the cold air inlet portion and the warm air inlet portion are controlled by said wax thermostat.

7. Apparatus for regulating the temperature of intake air in an internal combustion engine, said apparatus comprising an intake air duct comprising a cold air inlet portion, a warm air inlet portion and a mixed air duct portion; a control flap pivotally disposed in said air intake duct so as to be movable between first and second end positions, said control flap in said first end position closing said cold air inlet portion, and said control flap in said second end position closing said warm air inlet portion; a wax thermostat arranged in said air intake duct so that intake air drawn in through the duct passes around said wax thermostat, said wax thermostat being operatively connected by a pull rod to said control flap for pivoting the control flap; a restoring spring situated on the pull rod; a longitudinal guide on said control flap for accommodating excess travel of the wax thermostat, a sliding element disposed in said longitudinal guide, and an excess travel spring arranged on said longitudinal guide for compensating for excess travel of the wax thermostat, said longitudinal guide having a hook disposed on the control flap, said hook being engaged by said pull rod.

* * * * *